Nov. 4, 1930.  G. F. HOPKINS  1,780,390
LATHE AND LATHE CHUCK
Filed Aug. 17, 1927   2 Sheets-Sheet 2
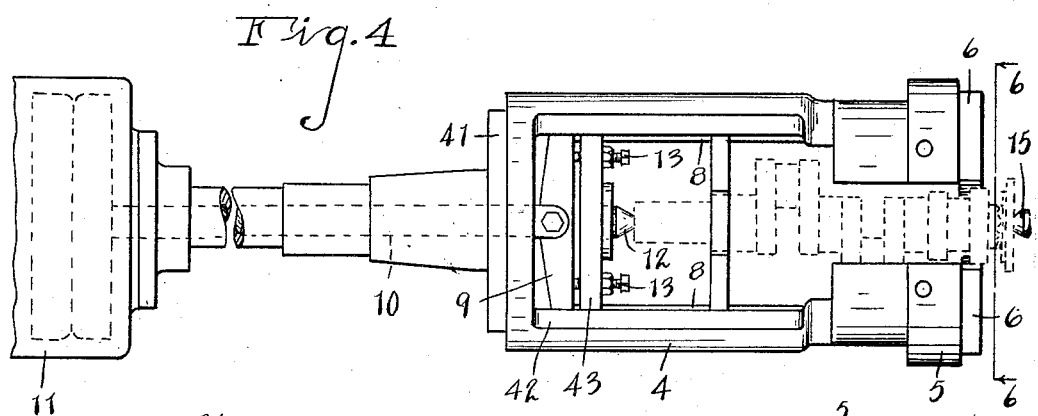
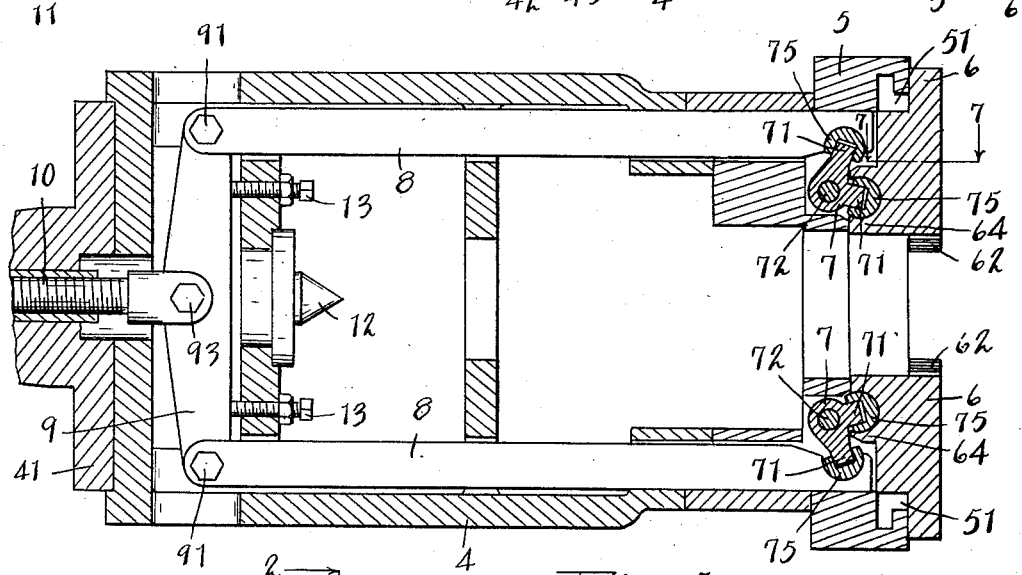
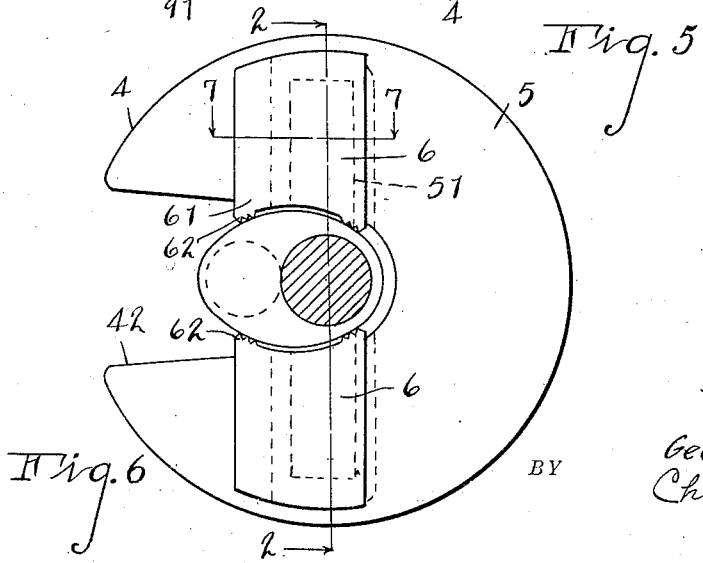
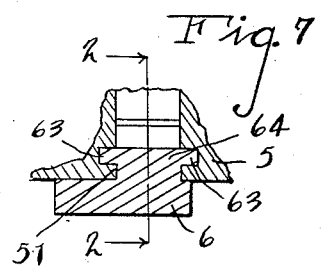
INVENTOR.
George F. Hopkins
Chappell & Earl
ATTORNEYS Patented Nov. 4, 1930

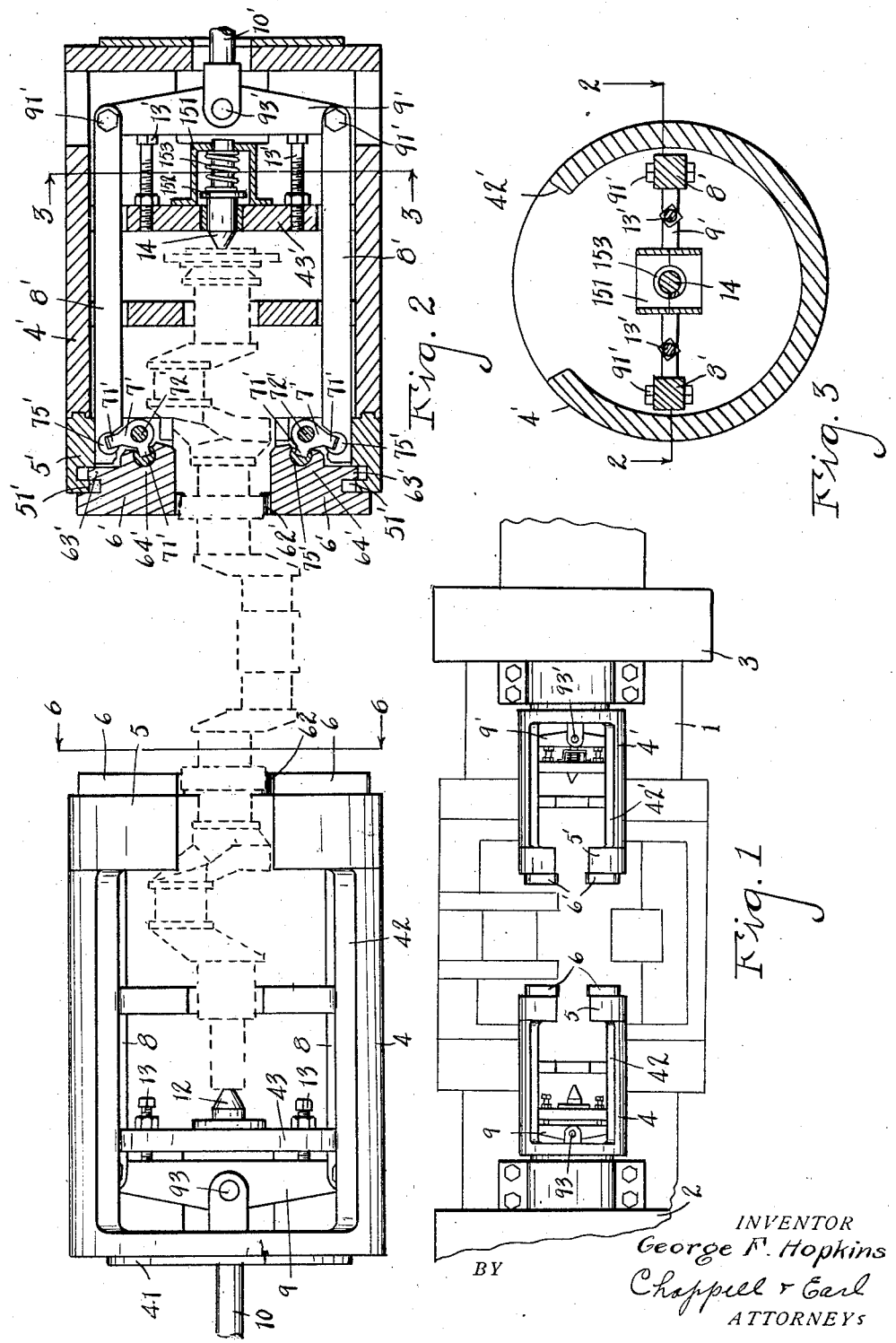

1,780,390

UNITED STATES PATENT OFFICE

GEORGE F. HOPKINS, OF JACKSON, MICHIGAN; WILLIAM K. SAGENDORPH EXECUTOR OF SAID GEORGE F. HOPKINS, DECEASED

LATHE AND LATHE CHUCK

Application filed August 17, 1927. Serial No. 213,554.

This invention relates particularly to improvements in lathes and lathe chucks. The objects of the invention are, First, to provide a lathe with an improved chuck structure, the body of which is hollow and open at the side like a trough or cradle.

Second, to provide a chuck with equalized jaws that will firmly chuck a centered part like a crankshaft without distortion or strain.

Third, to provide a specially constructed chuck adapted to the turning of bearings and pins on crank shafts of automobiles and similar work.

Objects relating to details and economies of construction and operation will appear from the detailed description to follow. The invention is defined in the claims. Structures which are preferred embodiments of my invention are illustrated in the accompanying drawings, in which Fig. 1 is a plan view of a lathe with double headstock, the lathe illustrated being of the Wickes Brothers make.

Fig. 2 is an enlarged detail plan of the opposed chucks of such lathe, being in section on line corresponding to line 2—2 of Figs. 3 and 6, and the position of an automobile shaft being indicated by dotted lines.

Fig. 3 is an enlarged detail cross sectional elevation view, on line 3—3 of Fig. 2.

Fig. 4 is an enlarged detail plan view in broken section, showing the connection of the lathe chuck to an air cylinder, the structure being shown in a single chuck structure which, however, is identical with the left hand chuck and part of Figs. 1 and 2.

Fig. 5 is an enlarged detail sectional plan view of the chuck part appearing in Fig. 4 which is the same as the chuck at the left of Fig. 2.

Fig. 6 is an enlarged detail sectional view of the chuck face and jaws in place on the crank arm of an automobile engine shaft, taken on line 6—6 of Figs. 2 and 4.

Fig. 7 is an enlarged detail section of one of the jaws in its slideway on the chuck face, taken on line 7—7 of Figs. 5 and 6.

The parts will be identified by their numerals which are the same in all the views.

1 is the lathe bed. 2 is the headstock. 3 is a modified tailstock, being precisely the same as the headstock except symmetrical, and supported and driven the same, this being the common structure in a Wickes Brothers lathe as above mentioned. 4 is the general body of the headstock chuck and 4' is the general body of the tailstock chuck, which is symmetrical with the headstock chuck and otherwise similar to it. I have numbered the parts of the tailstock with numerals the same as the headstock chuck with the addition of a prime, so far as the same are identical and symmetrical. I will describe the headstock chuck in detail.

The body 4 is provided with an attaching plate 41 for attachment to the headstock spindle of the lathe. The body is open at one side at 42 like a trough or cradle, this opening extending through the front plate of the chuck. 5 is the front or jaw plate which is provided with ways 51 for the jaws. 6 are the jaws offset at 61 and provided with teeth 62 for engagement with the arms of a crankshaft. These jaws have inwardly-projecting ribs 63 for engaging the guideways in the chuck and with inwardly-projecting lugs 64 for actuation by the chuck bell crank. 7 are the bell cranks provided with squared ends 71 and pivoted at 72 to the chuck body. The squared ends engage longitudinally slotted bearings 75, as clearly seen in Fig. 5. 8 are the bell crank connecting bars disposed longitudinally within ways in the sides of the body. 9 is the equalizer for the bell crank connection, connected at each end by pivots 91 to the bell crank connecting bars 8, 8. The equalizer 9 is pivotally connected at 93 with the piston rod 10 controlled by the air cylinder. 11 is the air cylinder attached by a suitable adapter to the lathe spindle in a well known way.

A cross partition 43 is provided in the chuck body and the lathe center pin 12 is secured fixedly to this partition. 13, 13 are adjustable stop screws carried in the partition 43 to cooperate with the equalizer to secure the full even opening of the jaws of the chuck, as seen in Figs. 2 and 5.

The tail chuck has similar parts to which I have, as above indicated, affixed the same numerals with a prime. The center pin on the tailstock is a spring pin 14 which reciprocates through the partition 43′, and is provided with a suitable guide 151 and has a collar 152 against which spring 153 acts to hold the said center pin yieldingly in position. Whenever the chuck is made use of in an ordinary lathe, the tail center pin 15, as indicated in Fig. 4, is of the usual lathe construction.

In operation the chucks are turned open side up, the crankshaft is placed within the cradle thus formed, with the jaws open, and the shaft is engaged and centered by the center pins 12 and 14. Then the jaws are actuated by the air cylinder through the equalizers 9 and 9′, which cause the jaws to engage with equal pressure very firmly, but because they are equalized they have no tendency whatever to move the crankshaft off the center but chuck it very firmly in place. The turning tool is brought into use between the two chucks. When only the left hand chuck is made use of, it holds the work on the center, but of course the shaft is not so firmly held as by the double chucks.

This invention is adapted to chuck any irregular form without distortion because of the equalizer. The particular construction of the chuck member open at the side is of advantage for chucking various articles whether the equalizer is made use of or not.

The structure is capable of wide variations without departing from my invention.

I desire to claim the same specifically and also broadly as pointed out in the appended claims.

Having thus described my invention what I claim as new and desire to secure by Letters Patent is:

1. In a chuck structure, the combination of a hollow chuck body with front plate open at the side like a cradle, a cross wall with lathe center pin, chuck jaws adapted to out of round bodies in suitable ways on said front plate, bell cranks for actuating the same having squared ends and longitudinally slotted pivot connections, an equalizer bar, adjustable stops for the equalizer bar, pneumatic actuating connections pivotally connected to the center of said bar, and links connected to the ends of said equalizer bar disposed in suitable guides on opposite sides of said chuck body and connected to the chuck jaw bell cranks, coacting as specified.

2. In a pneumatic chuck structure, the combination of a hollow chuck body with front plate open at the side like a cradle, a cross wall with lathe center pin, chuck jaws adapted to out of round bodies in suitable ways on said front plate, bell cranks for actuating the same, an equalizer bar, adjustable stops for the equalizer bar, pneumatic actuating connections pivotally connected to the center of said bar, and links connected to the ends of said equalizer bar disposed in suitable guides on opposite sides of said chuck body and connected to the chuck jaw bell cranks, coacting as specified.

3. In a chuck structure, the combination of a hollow chuck body with front plate open at the side like a cradle, a cross wall with lathe center pin, chuck jaws adapted to out of round bodies in suitable ways on said front plate, bell cranks for actuating the same, an equalizer bar, adjustable stops for the equalizer bar, actuating connections pivotally connected to the center of said bar, and links connected to the ends of said equalizer bar disposed in suitable guides on opposite sides of said chuck body and connected to the chuck jaw bell cranks, coacting as specified.

4. In a chuck structure, the combination of a hollow chuck body with front plate open at the side like a cradle, a cross wall with lathe center pin, chuck jaws adapted to out of round bodies in suitable ways on said front plate, bell cranks for actuating the same, an equalizer bar, actuating connections pivotally connected to the center of said bar, and links connected to the ends of said equalizer bar disposed in suitable guides on opposite sides of said chuck body and connected to the chuck jaw bell cranks, coacting as specified.

5. In a chuck structure, the combination of a hollow chuck body with front plate open at the side like a cradle, a cross wall with lathe center pin, chuck jaws adapted to out of round bodies in suitable ways on said front plate, and equalizer means to actuate said jaws to clamp said out of round work after it has been centered, coacting to maintain the work in centered position after it is clamped, as specified.

6. In a pneumatic chuck structure, the combination of a pair of opposed hollow chuck bodies with front plates open at the side like cradles and with cross walls with lathe center pins, one of which is a spring pin, chuck jaws adapted to out of round bodies in suitable ways on said front plates, bell cranks for actuating the same, an equalizer bar for each, pneumatic actuating connections pivotally connected to the center of each of said equalizer bars, and links connecting the ends of said equalizer bars to the said bell cranks, coacting as specified.

7. In a chuck structure, the combination of a pair of opposed hollow chuck bodies with front plates open at the side like cradles and with cross walls with lathe center pins, one of which is a spring pin, chuck jaws adapted to out of round bodies in suitable ways on said front plates, bell cranks for actuating the same, an equalizer bar for each, actuating connections pivotally connected to the center of each of said equalizer bars, and links connecting the ends of said equalizer bars to the said bell cranks, coacting as specified.

8. In a chuck structure, the combination of a pair of opposed chuck bodies with front plates open at the side like cradles and with cross walls with lathe center pins, one of which is a spring pin, chuck jaws in suitable ways on said front plates, bell cranks for actuating the same, an equalizer bar for each, actuating connections pivotally connected to the center of each of said equalizer bars, and links connecting the ends of said equalizer bars to the said bell cranks, coacting as specified.

9. In a chuck structure, the combination of a pair of opposed chuck bodies with front plates open at the side like cradles and with cross walls with lathe center pins, chuck jaws in suitable ways on said front plates, bell cranks for actuating the same, an equalizer bar for each, actuating connections pivotally connected to the center of each of said equalizer bars, and links connecting the ends of said equalizer bars to the said bell cranks, coacting as specified.

In witness whereof I have hereunto set my hand.

GEORGE F. HOPKINS.